US008314336B2

(12) United States Patent
Liang et al.

(10) Patent No.: US 8,314,336 B2
(45) Date of Patent: Nov. 20, 2012

(54) SPECIALTY CEILING STRUCTURE AND FUNCTIONAL CEILING GRID

(75) Inventors: Ying (Lora) Liang, Vernon Hills, IL (US); Daniel Boss, Lake Villa, IL (US); Graeme Gee, Naperville, IL (US)

(73) Assignee: USG Interiors, LLC, Chicago, IL (US)

( * ) Notice: Subject to any disclaimer, the term of this patent is extended or adjusted under 35 U.S.C. 154(b) by 526 days.

(21) Appl. No.: 12/603,088

(22) Filed: Oct. 21, 2009

(65) Prior Publication Data

US 2010/0126090 A1 May 27, 2010

Related U.S. Application Data

(60) Provisional application No. 61/118,075, filed on Nov. 26, 2008.

(51) Int. Cl.
*H02G 3/04* (2006.01)
*E04C 2/52* (2006.01)

(52) U.S. Cl. ...................... 174/68.1; 174/491; 174/40 R; 174/480; 52/220.6; 52/506.07; 439/121; 362/147

(58) Field of Classification Search .................. 174/480, 174/481, 68.1, 68.3, 491, 40 R, 502, 72 R, 174/72 B; 248/906, 343; 52/220.6, 506.7, 52/220.1, 506.06; 439/121, 110; 362/147
See application file for complete search history.

(56) References Cited

U.S. PATENT DOCUMENTS 3,146,956 A 9/1964 Schwartz et al.
3,559,146 A 1/1971 Vantonen
3,590,135 A 6/1971 Herbenar et al.
3,649,741 A 3/1972 Fremont
3,683,101 A 8/1972 Liberman
3,710,530 A 1/1973 Valtonen
3,725,568 A 4/1973 Stanley
3,781,567 A 12/1973 Papsco
3,798,865 A * 3/1974 Curtis ........................ 52/506.07
3,898,782 A 8/1975 Donato
3,918,224 A 11/1975 Sundequist
3,919,457 A 11/1975 Steiner
4,414,617 A 11/1983 Galindo
4,420,798 A 12/1983 Herst et al.
4,540,847 A 9/1985 Gardner
4,586,841 A * 5/1986 Hunter ........................ 52/506.06
(Continued)

FOREIGN PATENT DOCUMENTS

JP 2004036138 A 2/2004

OTHER PUBLICATIONS

International Search Report, PCT/US2009/061611, dated Jun. 1, 2010.

*Primary Examiner* — Angel R Estrada
(74) *Attorney, Agent, or Firm* — Pearne & Gordon LLP

(57) ABSTRACT

A rectangular ceiling tile proportioned for use in a standard rectangular ceiling grid module formed by grid tees, the tile having a pair of conductors arranged to feed low voltage electrical power from the grid elements to an electric or electronic device carried on the tile, the conductors each extending to an edge or edges of the tile and adapted to make physical contact with a conductor carried on a grid element when supported on such grid element.

5 Claims, 6 Drawing Sheets

U.S. PATENT DOCUMENTS

| | | | | |
|---|---|---|---|---|
| 4,631,648 | A | 12/1986 | Nilssen | |
| 5,342,204 | A | 8/1994 | Och | |
| 5,390,461 | A | 2/1995 | Dwyer | |
| 5,803,755 | A | 9/1998 | Kuchar et al. | |
| 5,868,489 | A | 2/1999 | Fuller et al. | |
| 6,033,097 | A | 3/2000 | Harwood | |
| 6,527,406 | B1 | 3/2003 | Slesinger et al. | |
| 6,540,372 | B2 | 4/2003 | Joseph | |
| 6,540,373 | B2 * | 4/2003 | Bailey | 362/147 |
| 6,722,918 | B2 | 4/2004 | McCoy | |
| 7,351,075 | B1 | 4/2008 | Patterson et al. | |
| 7,762,821 | B2 * | 7/2010 | Patterson et al. | 362/147 |
| 8,146,316 | B2 * | 4/2012 | Boss et al. | 52/506.07 |
| 2002/0109984 | A1 | 8/2002 | Bischel et al. | |
| 2003/0021116 | A1 | 1/2003 | Miller et al. | |
| 2007/0103824 | A1 | 5/2007 | Patterson et al. | |
| 2008/0087464 | A1 | 4/2008 | Patterson et al. | |
| 2008/0090431 | A1 | 4/2008 | Patterson et al. | |
| 2008/0090432 | A1 | 4/2008 | Patterson et al. | |
| 2008/0155915 | A1 | 7/2008 | Howe et al. | |
| 2008/0197702 | A1 | 8/2008 | Banach | |

* cited by examiner

FIG. 8
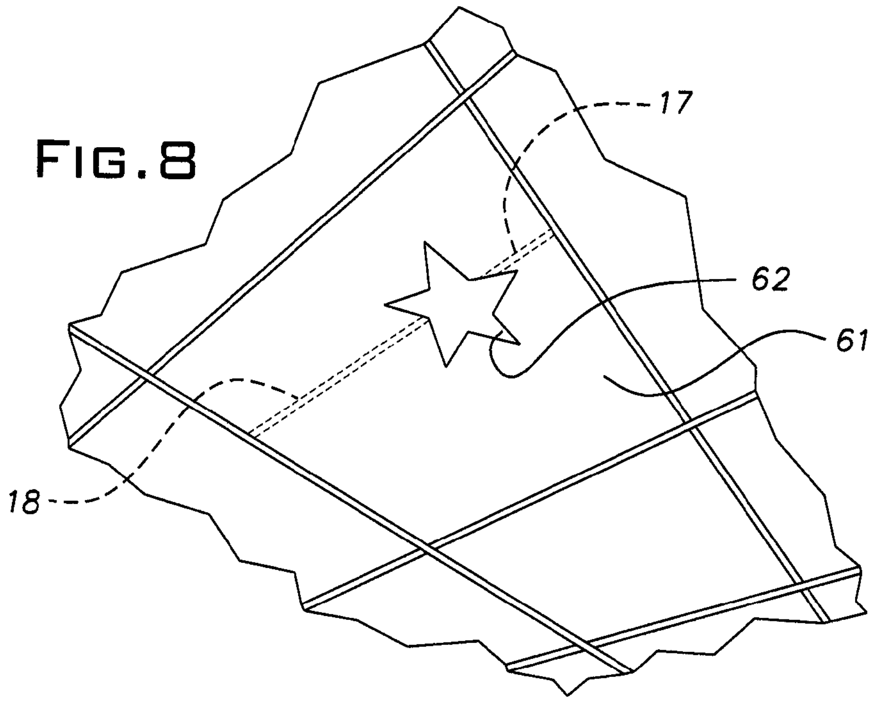
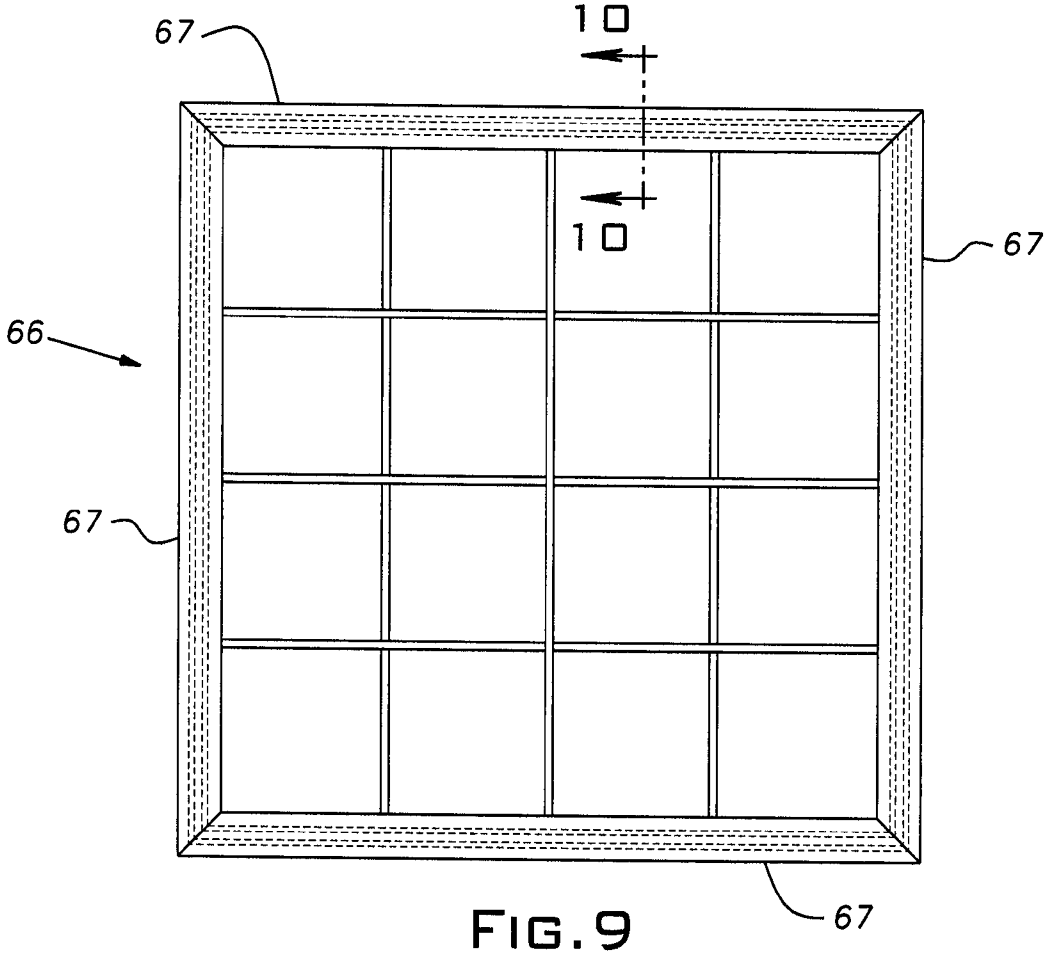
FIG. 9

SPECIALTY CEILING STRUCTURE AND FUNCTIONAL CEILING GRID

BACKGROUND OF THE INVENTION

This application claims the priority of U.S. Provisional Application No. 61/118,075, filed Nov. 26, 2008.

The invention relates to suspended ceiling structures and, in particular, to electrification of such ceiling structures.

PRIOR ART

Commercial building spaces such as offices, laboratories, light manufacturing facilities, health facilities, meeting and banquet hall facilities, educational facilities, common areas in hotels, apartments, retirement homes, retail stores, restaurants and the like are commonly constructed with suspended ceilings. These suspended ceiling installations are ubiquitous, owing to their many recognized benefits. Such ceilings ordinarily comprise a rectangular open grid suspended by wire from a superstructure and tile or panels carried by the grid and enclosing the open spaces between the grid elements. The most common form of grid elements has an inverted T-shaped cross-section. The T-shape often includes a hollow bulb at the top of the inverted stem of the T-shape. A popular variant of this standard T-shape includes a downwardly open C-shaped channel formed by the lower part of the inverted tee.

Advances in electronics has fed further advances and lead the world into the digital age. This digital movement creates an ever-increasing demand for low voltage direct current (DC) electrical power. This demand would seem to be at least as great in finished commercial space as any other occupied environment. A conventional suspended ceiling has potential to be an ideal structure for distributing low voltage electrical power in finished spaced. Many relatively low power devices are now supported on such ceilings and newer electronic devices and appliances are continuously being developed and adopted for mounting on ceilings.

The ceiling structure, of course, typically overlies the entire floor space of an occupiable area. This allows the ceiling to support electronic devices where they are needed in the occupied space. Buildings are becoming more intelligent in energy management of space conditioning, lighting, noise control, security, and other applications. The appliances that provide these features including sensors, actuators, transducers, speakers, cameras, recorders, in general, all utilize low voltage DC power.

As the use of electronics grows, the consumption of low voltage electrical power likewise grows. This seemingly ever accelerating appetite for DC power presents opportunities for more efficient transformation of relatively high voltage utility power typically found at 110/115 or 220/240 alternating current (AC) volts with which the typical enclosed space is provided. Individual power supplies located at the site of or integrated in an electronic device, the most frequent arrangements today, are often quite inefficient in transforming the relatively high voltage AC utility power to a lower DC voltage required by an electronic device. Typically, they can consume appreciable electric power in a standby mode when the associated electronic device is shut off. It is envisioned that a single DC power source serving the electronic needs of a building or a single floor of a building can be designed to be inherently more efficient since its cost is distributed over all of the devices it serves and because it can take advantage of load averaging strategies.

SUMMARY OF THE INVENTION

The invention provides accessories and components useful with and adapted to be carried on electrified suspended ceiling gird. In accordance with the invention, ceiling panels or tiles are arranged with conductive circuits that transmit electrical power from that carried on a supporting grid system. In some arrangements, the electrical circuit includes a connector that automatically makes electrical contact with the grid circuitry when the panel or tile is put in place on the grid. In accordance with other aspects of the invention, specialty border elements used in suspended ceiling islands distribute electrical power to the grid on which it is assembled and to electrical devices carried on the grid.

BRIEF DESCRIPTION OF THE DRAWINGS

FIG. 8 is a schematic perspective view of a suspended ceiling having a decorative ceiling tile;

FIG. 9 is a schematic plan view of a suspended ceiling island; and

DESCRIPTION OF THE PREFERRED EMBODIMENTS

Figure 1:
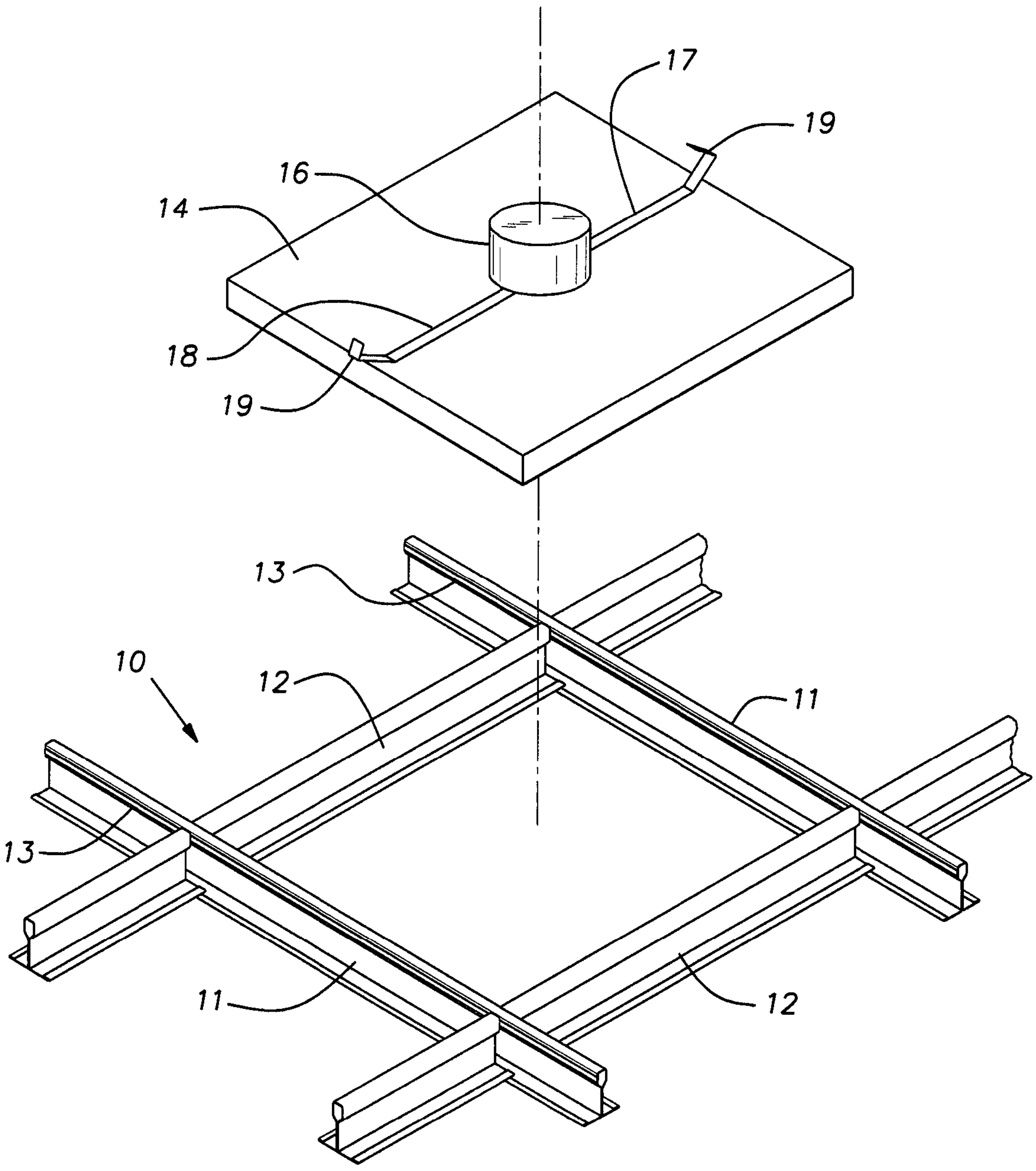
FIG. 1 is a schematic fragmentary exploded isometric view of a suspended ceiling grid and a ceiling panel embodying the invention.
Figure 2:
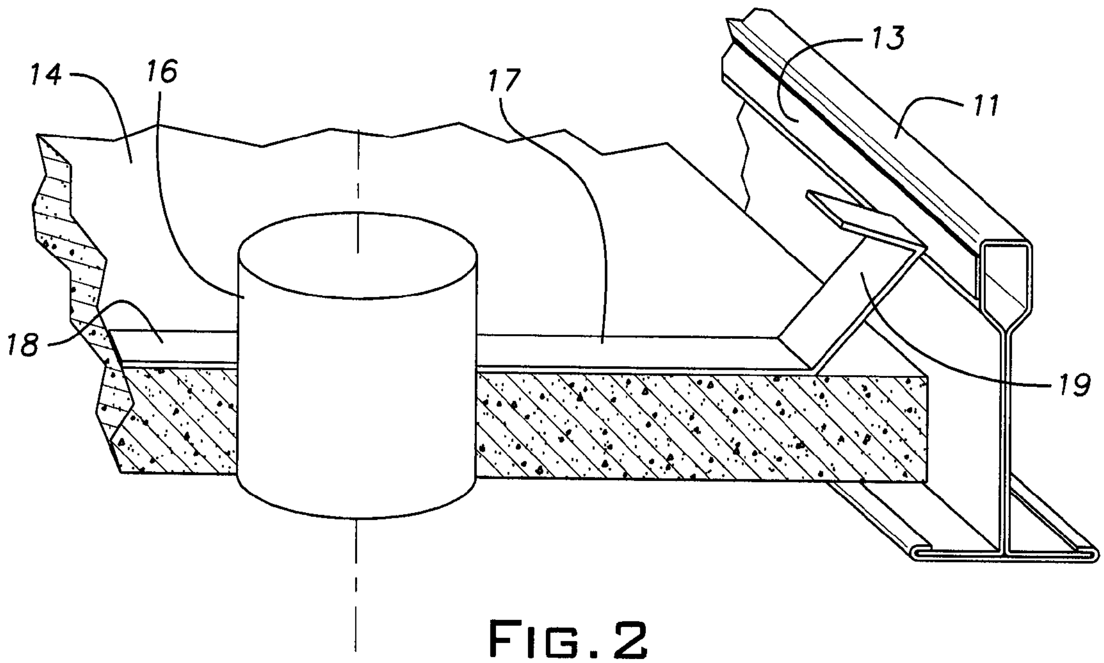
FIG. 2 is a schematic isometric cross-sectional elevational view of the suspended ceiling system illustrated in FIG. 1.

Referring now to FIGS. 1 and 2, a suspended ceiling grid 10 having main tees 11 and cross tees 12 of generally conventional cross-section is electrified by the provision of electrically conductive strips 13 running lengthwise on selected ones or all of the tees 11, 12. The conductive strips 13 normally are electrically isolated from the tees 11, 12, where the tees are formed of steel, aluminum or other conductive material, as is typical. The conductive strips 13 disclosed in the various figures can be a conductive ink, or a suitable metal foil or tape or wire of copper or aluminum, for example. Where the tees are electrically conductive themselves, they can serve as a conductive strip providing that they are suitably electrically insulated from appropriate other tees.

A ceiling panel 14 of suitable material, known in the industry, having physical stability, fire resistance and, preferably, acoustic properties, is illustrated at 14. In plan view, the panel 14 is rectangular, being square and having nominal dimension of 2'×2' or metric equivalent, for example, or being somewhat elongated normally at 2'×4' or metric equivalent, for example. The panel 14 has an electric or electronic device 16 mounted thereon. The device 16 can be a light fixture using light emitting diodes (LEDs), a speaker, a sensor for building control, security, or other function, a wireless support device, a camera, or other known device or apparatus having modest or limited electrical power consumption.

On its upper side, the ceiling panel 14 has two separate electrical conductors 17, 18. The conductors 17, 18 can have the same or like construction as that described for the strips 13. In the arrangement of FIGS. 1 and 2, as well as certain other figures, the conductors 17, 18 run from the electronic device in opposite directions so that they draw current between the grid tee conductive strips 13 at opposite polarities on separate grid tees. Those skilled n the art, however, will understand that multiple conductive strips 13 can be provided on a single tee 11 or 12 and a ceiling panel can have its conductors 17, 18 in a parallel arrangement such that they are connected to these separate conductors 13, on a common tee. Moreover, a ceiling panel can be arranged with its electrical conductors 17, 18 to connect to conductive strips on the tees 11, 12 where such tees are perpendicular to one another.

At the end of each of the conductors 17, 18, a flexible conductive leaf 19 is fixed to an edge of the panel 14. The leaf 19, which is in electrical continuity with an associated conductive strip 17 or 18, serves as a contact to establish an electrical circuit with the adjacent conductive strip 13 on the tee 11, or 12, supporting the respective edge of the panel 14. The leaf 19 is configured to automatically make contact with a conductive strip 13 when the panel 14 is in position on the grid 10. Additionally, the leaf 19 is configured to allow the panel 14 to have a limited degree of lateral freedom to accommodate normal dimensional variations in the grid 10 and panel 14 as well as permitting the panel to be lifted from below the ceiling to gain access to the plenum above the plane of the ceiling.

Figure 3:
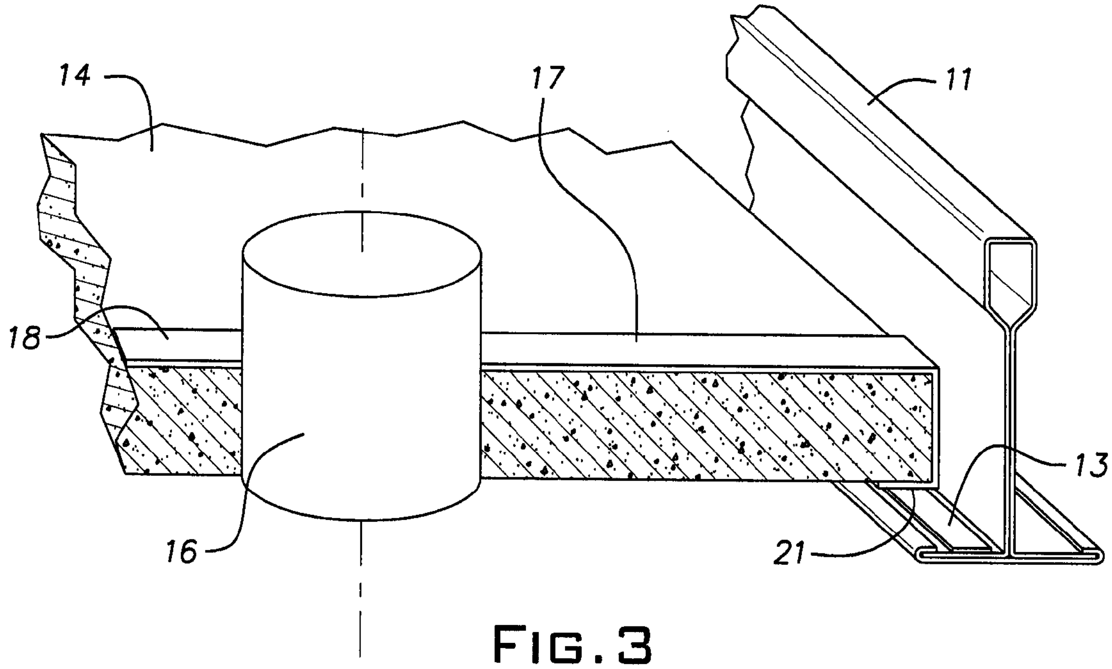
FIG. 3 is a fragmentary cross-sectional isometric view of a modified form of a grid tee and ceiling panel.

Referring now to FIG. 3, a tee, 11 or 12, carries a conductive strip 13 on the upper side of its lower flange. A ceiling panel 14 has an electrical contact 21 formed by a strip of electrically conductive material which is in electrical continuity with the respective electrical conductor 17 or 18. Alternatively, the contact 21 can be an extension of the respective conductor 17 or 18, that is wrapped along the vertical edge of the ceiling panel 14 and brought under a limited portion of the front or lower face of the panel. The contact 21 is fixed to the panel 14 with a suitable adhesive or other expedient.

Figure 4:
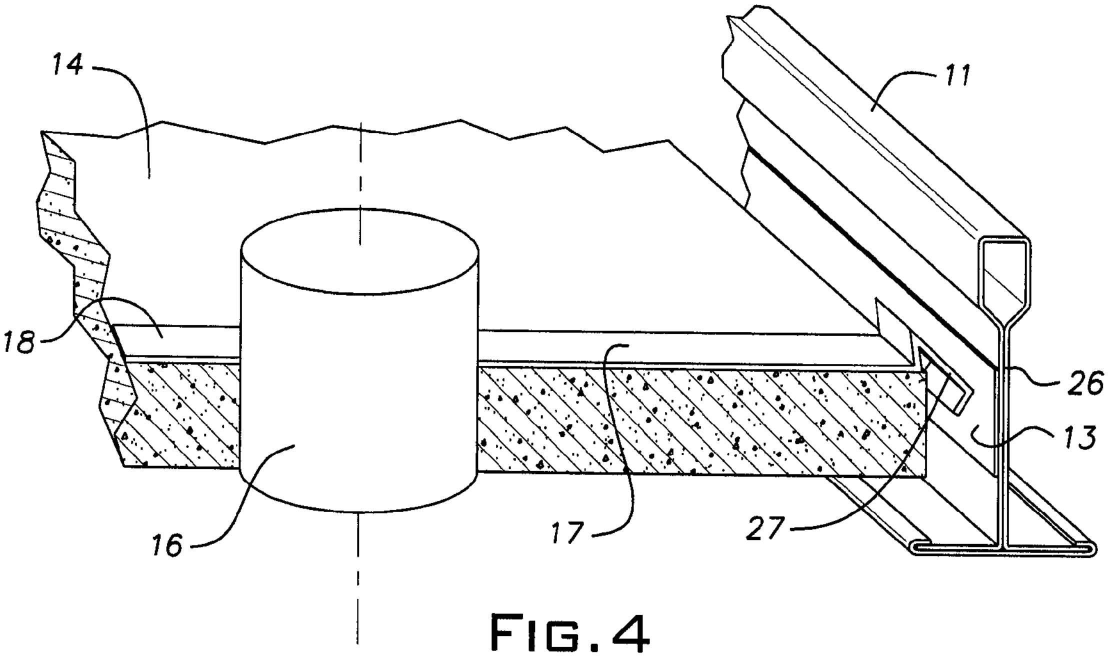
FIG. 4 is a fragmentary cross-sectional isometric view of another modified grid tee and panel.

With reference to FIG. 4, the tees 11 and 12 have their conductor strips 13 positioned on their vertical webs 26. A leaf spring 27 attached to the edge of the panel makes electrical contact with a conductor strip 13. The leaf spring is electrically continuous with an associated conductor 17 or 18. As before, a panel 14 is provided with two leaf spring contacts 27 to account for the opposite polarities.

Figure 5:
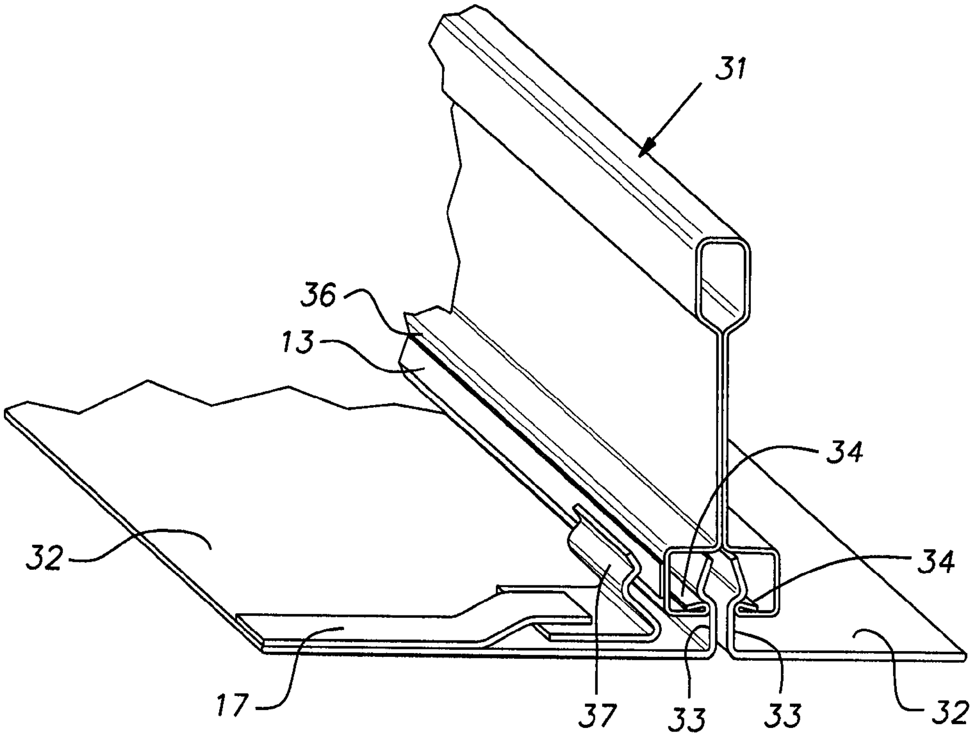
FIG. 5 is a fragmentary cross-sectional isometric view of a slotted grid tee and pan type ceiling tile.

With reference to FIG. 5, there is shown a generally conventional style grid tee 31 of the open channel or slotted type. A pan-like ceiling tile 32 of known construction formed of sheet metal such as aluminum has an upstanding skirt or flange that snaps over inwardly bent edges 34 of the tee 31. The tile 32 is retained on the tee by a grip of its flange 33 on the tee edges 34. The tile is removable downwardly from the grid tees 31 to provide access to the plenum above the plane of the ceiling. A conductive strip 13 is provided on the vertical side 36 of the tile supporting flange of the grid tee. A conductive leaf spring 37 of copper or brass or like material is fixed to an upper side of the pan 32 in a manner that isolates it electrically from the pan. The leaf spring conductor 37 is electrically connected to an associated conductor 17, 18 which as in earlier embodiments, are operably connected to the electronic device 16 carried by the tile or panel 32. The conductors 17, 18 are electrically insulated from the pan 32. As an alternative arrangement, the body of the grid tees can be one polarity and the conductive strip 13 can be of the opposite polarity. In this circumstance, the pan can be at the same polarity as the grid tees 31 and only one leaf spring 37 and conductor strip 17 need be used. One electrical side of the device 16 is connected to the strip and the other electrical side of the device is connected to the pan or tile 32.

Figure 6:
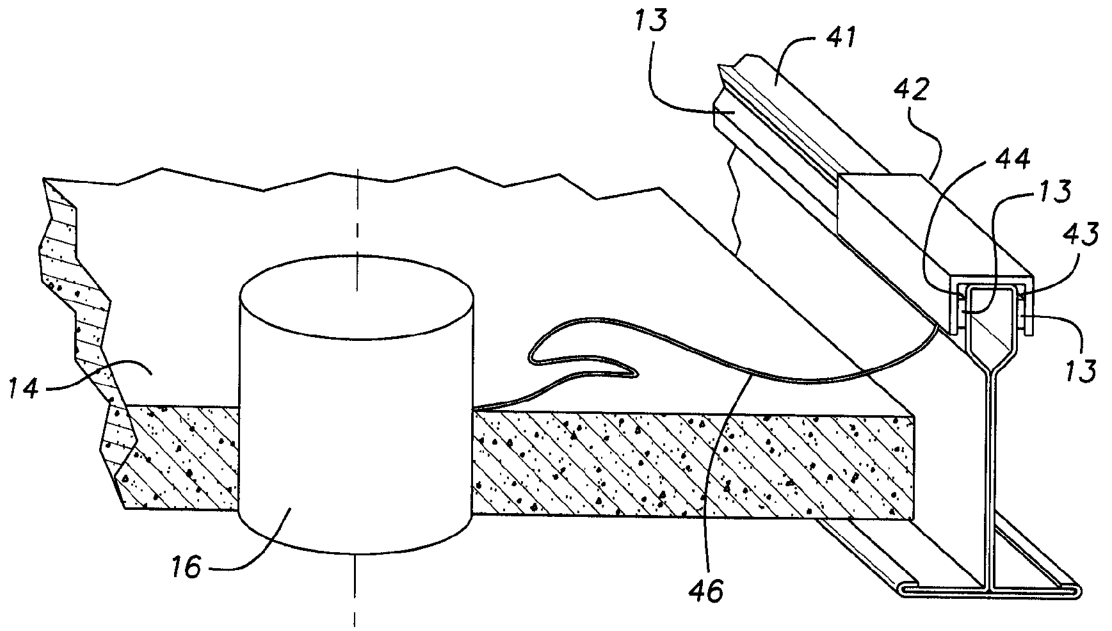
FIG. 6 is a schematic isometric cross-sectional elevational view of a grid tee and ceiling panel with a variant manner of connecting an electronic device to the grid tee.

In FIG. 6, the grid tee is provided with a pair of conductive strips 13 on opposite sides of its reinforcing bulb designated 41. A C-shaped or channel-shaped connector bracket 42 is assembled over the reinforcing bulb 41. The bracket 42 has a pair of individual contacts 43, 44, one on each side of the bulb 41. The contacts 43, 44 establish electrical communication between the conductive strips 13 and a two-wire or two-conductor lead 46. The lead 46 carries the voltage potential existing across the conductive strips 13 to an electronic device 16 on the panel 14.

Figure 7:
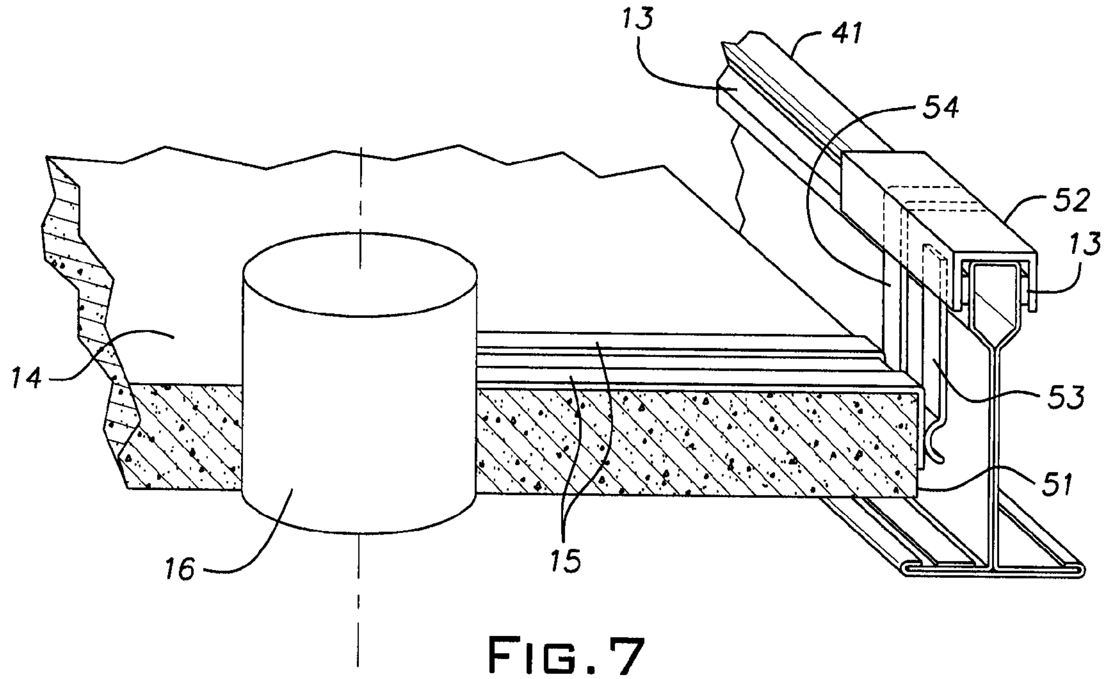
FIG. 7 is a schematic isometric cross-sectional elevational view of a grid tee and ceiling panel having respective electrical conductors and a connector for receiving power from a grid in accordance with the invention.

Referring to FIG. 7, the ceiling panel 14 has a pair of conductors 15. The conductors 15 are rolled or bent vertically down the vertical face 51 of the panel edge. A connector 52 molded or otherwise formed of a suitable electrically insulating material such as PVC carries two separate conductors 53, 54. The conductors 53, 54 can be made of spring-like conductive metal such as copper or brass and can be insert-molded in the connector 52, for example. Each conductor 53, 54 makes exclusive contact with one of the conductive strips 13 carried on opposite sides of the reinforcing bulb 41. Conductive strips 17, 18 on the panel 14 are each connected to one of the conductive strips 13 on the tee 11.

In the various disclosed embodiments of the invention, the conductive strips 13, 17 and 18 have their outer or exposed surfaces un-insulated to facilitate electrical connections with the various connecting elements. Alternatively, the conductors can be fully insulated except on points at which an electrical connection is to be made where such insulation can be omitted or removed.

Referring to FIG. 8, there is shown a suspended ceiling system in which the ceiling panel 61 has a decorative feature in the form of a cut-out in the shape of a star 62. The electronic or electrical device 16 in this arrangement can be an LED or series of LEDs on the upper side of the ceiling panel 61 and arranged to shine through the cut-out. The electronic device can be powered through conductive strips 17, 18 which in turn are electrically connected to conductive strips 13 on the grid tees 11 and 12 as described in the various preceding embodiments.

Figure 10:
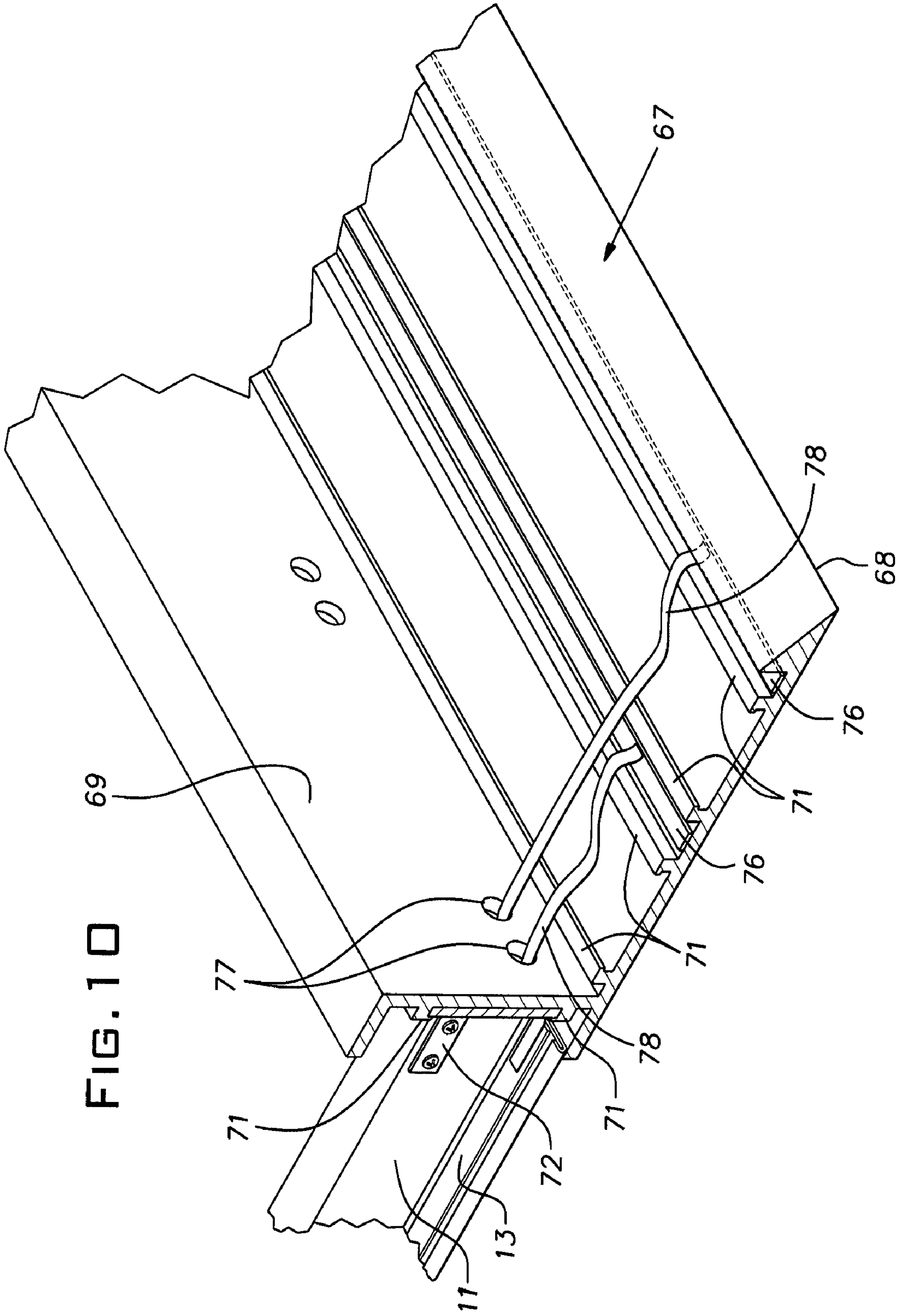
FIG. 10 is a fragmentary, schematic isometric cross-sectional view taken in the plane 10-10 indicated in FIG. 9 showing constructional details of the perimeter of the island ceiling.

Referring now to FIGS. 9 and 10, a suspended island ceiling 66 generally known in the art includes main tees 11 and cross tees 12. The tees 11, 12 are bordered by a perimeter trim 67 which can be, for example, an aluminum extrusion having a general shape of a right angle. The perimeter trim 67 has a low profile when viewed from below owing to a “knife” edge 68 and a low rise of a vertical leg 69. Parallel longitudinal formations 71 are undercut to retain splice plates (not shown) or trim attachment clips 72 used to mount the trim 67 to the ends of the tees 11, 12. Conductive strips 76 analogous to the conductive strips 13 are provided along the lengths of the trim 67. The conductive strips 76 are conveniently located along the forms 71, as shown. The perimeter trim mounted conductive strips 76 can serve to electrify the grid 10 that is confined to the island ceiling 66. FIG. 10 illustrates an exemplary manner in which electrical power is transmitted to the tees 11 or 12. The conductive strips 13 on the tees 11 and 12 are situated on the upper surfaces of the grid tee flanges. The vertical leg 69 of the perimeter trim 67 is apertured at the intersection of a grid tee 11, 12. This may be accomplished by drilling holes in the leg 69 on site when the island is being erected. Electrical jumpers 78 can be assembled through the holes 77. At one end, a jumper 78 makes contact with the respective conductive strip 76 on the trim 67 and at its other end makes contact with a conductive strip 13 on the tee 11, 12. The jumpers 78 are suitably electrically insulated with insulating material so as to not short out where it may contact the perimeter trim 67. Where desired, the trim 67 can be held at one polarity and the tees 11, 12 can be electrically connected to the trim. In this case, only one conductive strip 76 is needed.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A rectangular ceiling tile proportioned for use in a standard rectangular ceiling grid module formed by grid tees, the tile having a pair of conductors arranged to feed low voltage electrical power from the grid elements to an electric or electronic device carried on the tile, the conductors each extending to opposite edges of the tile, and including at each of said opposite edges a flexible conductive leaf spring adapted to make physical contact with a flat conductive strip carried on and along the length of a grid element when supported on such grid element, the leaf spring of the conductors are being arranged to automatically establish electrical contact with the conductive strip on a grid tee when the tile is set on the grid tee, the leaf spring being configured to have lateral freedom to accommodate normal dimensional variations in the grid module and panel as well as permitting the panel to be lifted from below the ceiling to gain access to the plenum below the plane of the ceiling.

2. A rectangular ceiling tile as set forth in claim 1, wherein the tile is arranged such that when it is supported on a grid tee, it is capable of making contact with a flat vertical conductive strip situated on an upper reinforcing bulb of the tee.

3. A rectangular ceiling tile as set forth in claim 1, wherein the tile is arranged such that when it is supported on a grid tee, it is capable of making contact with a flat vertical conductive strip situated on a generally vertical web of the tee.

4. A rectangular ceiling tile as set forth in claim 1, wherein the tile is arranged such that when it is supported on a grid tee, it is capable of making contact with a flat horizontal conductive strip situated on an upper surface of a horizontal flange of the tee.

5. A suspended island ceiling comprising a rectangular grid of intersecting tees, a trim strip suspended by the grid tees at the perimeter of the island, the trim strip having, in profile, the general shape of a right angle with a low rise vertical leg and a horizontal leg, at least one conductive strip on an upper side of the horizontal leg insulated from the body of the trim strip, and at least some of the tees each having at least one conductive strip insulated from their respective bodies, and electrical jumpers electrically connecting the conductive strip of the trim strip to the conductive strips of the tees, the electrical jumpers passing through holes in the vertical leg.

* * * * *